Jan. 11, 1938.  H. J. M. RASMUSSEN  2,105,331
FAUCET
Filed May 7, 1936
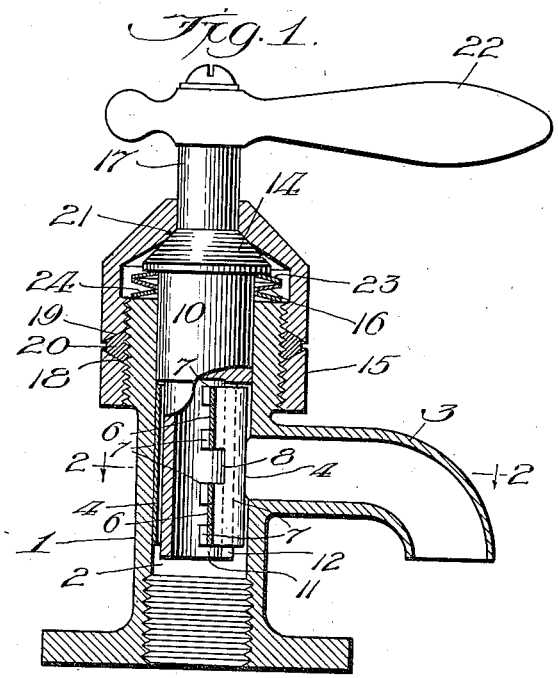
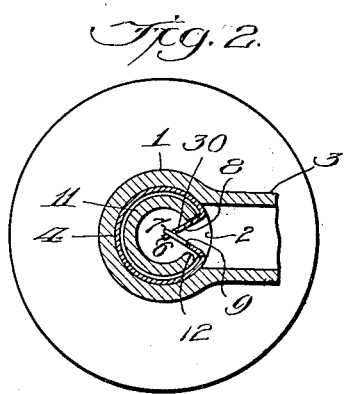
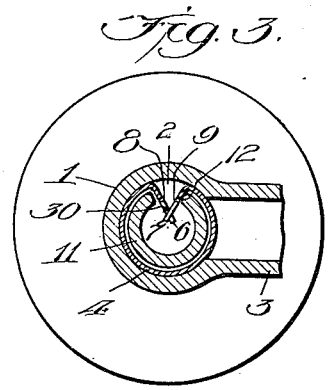
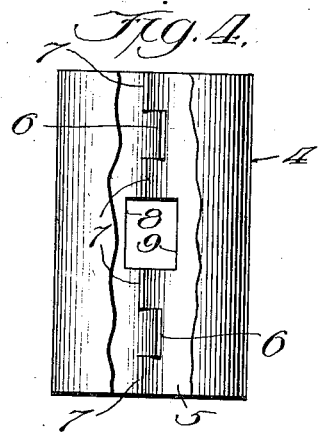
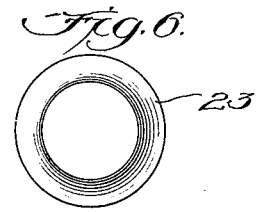
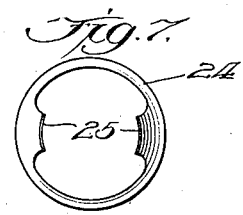
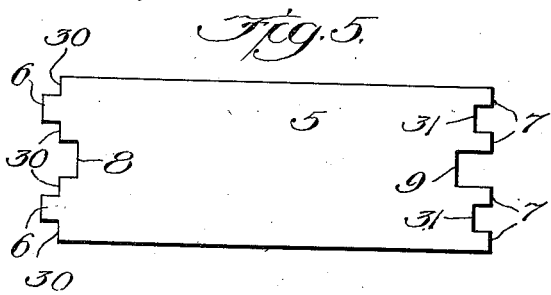
Inventor:
Hans J. M. Rasmussen,
By Wm. F. Freudenreich, Atty.

Patented Jan. 11, 1938

2,105,331

UNITED STATES PATENT OFFICE 2,105,331

FAUCET

Hans J. M. Rasmussen, Chicago, Ill.

Application May 7, 1936, Serial No. 78,376

11 Claims. (Cl. 251—96)

The object of the present invention is to produce a simple, efficient, and durable faucet construction in which the flow of fluids is controlled entirely by members of metal or other hard materials in contact with each other.

A further object of the present invention is to produce a simple and novel all-metal faucet which shall be self-adjusting to compensate for wear.

In carrying out my invention, I employ a valve element in the form of a thin sleeve of resilient metal divided along a longitudinal line so as to permit it to expand and contract, together with an actuator extending loosely into the sleeve and having a slot into which the meeting ends of the wall of the sleeve are bent to form a loose driving connection. One of the objects of the present invention is to produce a simple and novel construction which will guard against distortion of the sleeve through forces applied in turning the same by means of the actuator or in any other manner, and thus insure perfect contact between the sleeve and a surrounding cylindrical shell or the like.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a longitudinal central section through a faucet embodying the present invention, the faucet being shown open, and a portion of the valve stem or actuator being in elevation; Fig. 2 is a section on line 2—2 of Fig. 1; Fig. 3 is a view similar to Fig. 2, showing the valve turned sufficiently to close the faucet; Fig. 4 is an enlarged elevation of the sleeve valve, a longitudinal section being broken away to expose the inner side of the sleeve at the joint between the meeting ends of the band or plate from which the sleeve is made; Fig. 5 is a view, on a smaller scale than Fig. 4, showing the sheet or plate from which the valve sleeve is made, in a flat condition; Figs. 6 and 7 are top plan views of two of the spring washers that underlie a collar on the valve stem and serve to press this collar up against a bearing surface on an overlying cap; and Fig. 8 is an edge view of the washer shown in Fig. 7.

Referring to the drawing, 1 represents the body member of a faucet having a cylindrical bore 2. A spout 3 projects from one side of the faucet and communicates at its inner end with said bore, in the usual way.

The valve for shutting off communication between the bore 2 and the spout is a sleeve 4 of spring metal, conveniently formed from a metal plate, bent into the proper shape. In any event, the sleeve is divided along a longitudinal line, so that it may contract and expand. In its normal condition, the external diameter of the sleeve is slightly greater than the diameter of the bore in the body of the faucet, so that when the sleeve is inserted in the bore, it exerts an expansive or radial pressure which, if the sleeve has been properly ground or lapped into the bore, insures a fluid-tight fit, except for a longitudinal zone containing the joint.

The meeting ends of the wall of the sleeve are bent inwardly and are also interlocked to prevent relative movements between them in the direction of the length of the sleeve. The ends of the blank 5 from which the sleeve is made are preferably shaped to provide at opposite ends projecting ears which interengage in the manner of the pintle-receiving ears of a hinge. In the arrangement shown, there are two ears 6 at one end and four ears 7 at the other end. When the blank is bent or rolled into a tubular form, each of the ears 6 enters the space between two of the ears 7. Inward deflection of the metal of the sleeve begins at some distance from the two sets of ears, so as to avoid abrupt bends and cause the free ends of the ears to extend inwardly well toward the axis of the sleeve.

I prefer, also, to cut into the ends of the blank at about the longitudinal center of the latter, comparatively wide, deep notches 8 and 9 which, when the sleeve has been fashioned, provide a window of appreciable size, as best shown in Fig. 4. It should also be noted that the bends of the marginal portions of the blank are so made that the ears of one set cross those of the other set, as best shown in Figs. 2, 3 and 4.

Assuming that the sleeve valve is inserted in the bore of the body of the faucet in such a manner that the window produced between notches 8 and 9 is in about the plane of the spout of the faucet, and that it is turned until this window registers with the spout, it will be seen that fluids can enter the interior of the sleeve and flow through this window into the spout. Also, fluids can flow lengthwise of the sleeve, between the sleeve and the surrounding wall, through the tunnel or passage formed between the sleeve and the surrounding cylindrical wall in that zone in which lie the marginal portions of the sleeve wall which curve inwardly from the true surface of revolution. This condition is illustrated in Fig. 2. However, if the sleeve be turned through an angle of 90° or even less, the inlet end of the spout is sealed by an unmutilated and undeformed cylindrical portion of the sleeve, as shown in Fig. 3.

The sleeve valve is controlled by a suitable stem or actuator. In the arrangement shown, the body portion of the faucet extends well above the faucet, and the cylindrical bore 2 is continued out through the top thereof. Fitting rotatably in the upper end of this bore, above the sleeve valve, is a cylindrical stem member 10 having a downward extension 11 that is small enough in diameter not to touch the sleeve, but is provided with a longitudinal slot 12 into which the free ends of the ears 6 and 7 on the sleeve extend. The part 11 may be in the form of a tube having a longitudinal section cut out of the same from one end to the other to provide the slot into which the ears may extend.

On the part 10, above the body of the faucet, is an annular enlargement or collar 14 having a frusto-conical upper face. Between the collar and the top of the body of the faucet is a suitable spring on which the collar rests. Screwed upon the upper end of the body portion of the faucet are a ring-like member 15, and above the same, a cap 16 through the center of which a part 17 of the stem member, of reduced diameter, extends. The edges or rims that face each other on the two members, 15 and 16, are dished to provide the member 15 with a frusto-conical edge face 18 whose larger diameter is at the top, and the member 16 with a frusto-conical edge face 19 whose smallest diameter is at the top. Thus, when the two members are screwed upon the body of the faucet, their meeting edges form with the latter an annular space more or less triangular in cross section. In this space is arranged a washer or ring 20 of soft metal which may be compressed by screwing the cap down tightly and thus produce an effective seal between the cap and the body of the faucet. The spring device below the collar 14 constantly presses the conical face of this collar against a complementary internal face 21 on the cap. By grinding these two frusto-conical faces so as to cause them to fit perfectly together, all leakage of fluids upwardly past the valve stem is positively prevented.

The valve stem may be turned by a handle 22 attached to the outer end, or by any other suitable means.

The spring means that holds the valve stem or actuator raised may conveniently take the form of dish-shaped spring washers. In the arrangement shown, there are three of these washers; two of them, the washers 23, being simple dished rings of uniform radial widths, placed with their concave sides toward each other. The third ring 24 is a much narrower ring and has on the inner side fingers or projections 25 that slope in the same direction away from the plane of the ring. This ring is set on the upper end of the body member of the faucet, with the fingers or projections on the upper side. Therefore, the two washers 23 rest on the fingers or projections which are naturally not as stiff as the washers 23 and therefore make the spring device as a whole more yieldable than if the washer 24 were like the washers 23.

It will be seen that when the parts of the faucet are assembled, the spring sleeve or valve 4 floats and is not fastened to any other part or rigidly held in any particular position; but is at all times free to adjust itself so as to make the fullest possible contact with the surrounding stationary walls. The turning forces are not applied by the actuator to the fingers 6 and 7 but to the internal flanges from which the fingers project. One of the important features of my improved construction is that the sleeve valve is always moved from one angular position to another by forces which both push and pull the valve around. In other words, in shifting the valve from the position illustrated in Fig. 3 to that which it occupies in Fig. 2, assuming that the turning movement is counter-clockwise, the edge of the actuator on one side of the slot engages the flange at the base of the fingers 7 and pulls the sleeve around. At the same time, the flat faces of the fingers 7 engage with the shoulders 30 beside the fingers 6 and cause the sleeve to be pushed forward. When the handle of the faucet is turned in the opposite direction, namely in the clockwise direction as viewed in Figs. 2 and 3, the edge of the actuator on the opposite side of the slot comes into play, engaging the flange carrying the fingers 6, as shown in Fig. 2; whereas the flat sides of the fingers 6 now engage the shoulders 31 at the opposite end of the curved sheet or plate. Consequently, rotation of the valve sleeve in the clockwise direction is also effected by combined pulling and pushing forces. The result is that the actuator, when turning the valve, always exerts balanced pushing and pulling forces and thus causes no distortion of the valve sleeve.

Not only are the driving forces that rotate the sleeve valve always applied in such a way that any radial components thereof balance each other and thus do not tend to expand or contract the valve; but, through the interlocking of the ends of the cylindrical sheet or plate one end edge of the latter cannot move lengthwise relatively to the other and so no warping of the sleeve can be produced. Consequently, the valve will always function efficiently, if it be originally a good fit; and, as wear occurs, it automatically expands to the slight extent necessary to compensate for such wear and thus maintains the proper fit. The valve should therefore last indefinitely without requiring attention or repair. Also, since the valve stem and the screw cap make a fluid-tight joint with each other, which is self adjusting, and the joint between the cap and the body of the faucet is effectively sealed, the faucet as a whole should be as enduring as is the sleeve valve and, at most, may require a tightening of the screw cap a few times during its span of life.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A valve comprising a sheet of resilient metal bent into the form of a cylindrical sleeve, the said sheet having at the meeting edges ears that extend inwardly and cross each other, the ears preventing said edges from shifting relatively to each other lengthwise of the sleeve but permitting the sleeve to expand and contract freely.

2. In a valve device, a body member having a cylindrical bore and an outlet leading from one side of the latter, a sleeve of resilient metal fitting in said bore and divided longitudinally to permit it to expand and contract, a rotatable actuator extending loosely into said sleeve, flanges on the marginal sections of the sleeve along the line of division bent inwardly and having at their long free edges ears that cross each other and permit the long edge of each flange to engage a side face on the other flange, and elements on the actuator on opposite sides of the flanges to engage with one or the other of the latter upon rotation of the actuator and cause the sleeve to be turned by both a pulling and a pushing action.

3. In a valve device, a body member having a cylindrical bore opening out through the top thereof and an outlet at one side, a resilient expansible sleeve valve in said bore adapted to close said outlet or open it wholly or in part, a valve stem extending down into said valve, a collar on said stem above said faucet body member, dished spring washers around the stem between the top of the body member and said collar, said collar having a frusto-conical upper face, and a cap surrounding the stem and screwed upon the upper end of the said body member, said cap having an internal frusto-conical seat complementary to and engaged with the frusto-conical face of the said collar.

4. In a valve device, a body member having a cylindrical bore opening out through the top thereof and an outlet at one side, a resilient expansible sleeve valve in said bore adapted to close said outlet or open it wholly or in part, a valve stem extending down into said valve, a collar on said stem above said faucet body member, dished spring washers around the stem between the top of the body member and said collar, said collar having a frusto-conical upper face, a cap surrounding the stem and screwed upon the upper end of the said body member, said cap having an internal frusto-conical seat complementary to and engaged with the frusto-conical face of the said collar, and a ring screwed upon the upper end of said body member below said cap, and a metallic packing between and engaged by both the cap and said ring.

5. In a valve device, a body member having a cylindrical bore opening out through the top thereof and an outlet at one side, a resilient expansible sleeve valve in said bore adapted to close said outlet or open it wholly or in part, a valve stem extending down into said valve, a collar on said stem above said faucet body member, dished spring washers around the stem between the top of the body member and said collar, said collar having a frusto-conical upper face, a cap surrounding the stem and screwed upon the upper end of the said body member, said cap having an internal frusto-conical seat complementary to and engaged with the frusto-conical face of the said collar, and a ring screwed upon the upper end of said body member below said cap, and a metallic packing between and engaged by both the cap and said ring, the lower edge of the skirt portion of the cap and the upper edge of the ring being dished to produce between them an annular passage that is triangular in cross section with the base of the triangle next to the body of the faucet.

6. In a valve device, a body member having a cylindrical bore and an outlet leading from one side of the latter, a sleeve of resilient metal fitting in said bore and divided longitudinally to permit it to expand and contract, a rotatable actuator extending loosely into said sleeve, the marginal portions of the sleeve along opposite sides of the line of division of the sleeve being turned inwardly in converging relation to each other and engaging with each other along a longitudinal line parallel to the axis of the sleeve and spaced a considerable distance inwardly from the periphery of the sleeve, the parts being so proportioned that said inturned portions of the sleeve are under stress and tend constantly to expand the sleeve, and longitudinal elements on the actuator on opposite sides of the inturned parts of the sleeve to engage with one or the other of the latter upon rotation of the actuator and cause the sleeve to be turned by both a pulling and a pushing action.

7. In a valve device, a body member having a cylindrical bore and an outlet leading from one side of the latter, a sleeve of resilient metal fitting in said bore and divided longitudinally to permit it to expand and contract, a rotatable actuator extending loosely into said sleeve, flanges on the marginal sections of the sleeve along the line of division bent inwardly and having at their long free edges ears that cross each other and permit the long edge of each flange to engage a side face on the other flange a considerable distance, said flanges converging toward each other from the periphery of the sleeve toward the line of contact between the flanges and being under stress so as to tend constantly to expand the sleeve, and longitudinal elements on the actuator on opposite sides of the flanges to engage with one or the other of the latter upon rotation of the actuator and cause the sleeve to be turned by both a pulling and a pushing action.

8. In combination, a member having a cylindrical bore and an outlet leading from one side of the latter, a sleeve of resilient metal fitting in said bore and divided longitudinally to permit it to expand and contract, a rotatable actuator extending loosely into said sleeve, the marginal portions of the sleeve along opposite sides of the line of division of the sleeve being turned inwardly in converging relation to each other and engaging with each other along a longitudinal line parallel to the axis of the sleeve and spaced a considerable distance inwardly from the periphery of the sleeve, the parts being so proportioned that said inturned portions of the sleeve are under stress and tend constantly to expand the sleeve, and elements on the actuator on opposite sides of the inturned parts of the sleeve to engage with one or the other of the latter upon rotation of the actuator and cause the sleeve to be turned by both a pulling and a pushing action.

9. In combination, a member having a cylindrical bore and an outlet leading from one side of the latter, a sleeve of resilient metal fitting in said bore and divided longitudinally to permit it to expand and contract, a rotatable actuator extending loosely into said sleeve, flanges on the marginal sections of the sleeve along the line of division bent inwardly and having at their long free edges ears that cross each other and permit the long edge of each flange to engage a side face on the other flange a considerable distance, said flanges converging toward each other from the periphery of the sleeve toward the line of contact between the flanges and being under stress so as to tend constantly to expand the sleeve, and elements on the actuator on opposite sides of the flanges to engage with one or the other of the latter upon rotation of the actuator and cause the sleeve to be turned by both a pulling and a pushing action.

10. A valve comprising a sheet of resilient metal bent into the form of a cylindrical sleeve, the said sheet having the marginal portions at the meeting edges bent inward at an angle to each other and engaging with each other toward their inner free edges, said inturned portions having along their inner edges ears that interengage to prevent relative movements lengthwise of the sleeve while permitting the sleeve to expand and contract, said inturned portions being of sufficient width to serve as expanding devices for the sleeve when wear takes place while the sleeve is mounted in the cylindrical bore of a cooperative valve element.

11. A valve comprising a sheet of resilient metal bent into the form of a cylindrical sleeve, the said sheet having the marginal portions at the meeting edges bent inward at an angle to each other and engaging with each other toward their inner free edges, said inturned portions being of sufficient width to serve as expanding devices for the sleeve when wear takes place while the sleeve is mounted in the cylindrical bore of a cooperative valve element.

HANS J. M. RASMUSSEN.